United States Patent
Drobe et al.

(10) Patent No.: US 12,360,396 B2
(45) Date of Patent: Jul. 15, 2025

(54) METHOD FOR DETERMINING AN OPHTHALMIC LENS ADAPTED FOR CORRECTING AN ABNORMAL REFRACTION OF AN EYE OF A WEARER

(71) Applicant: Essilor International, Charenton-le-Pont (FR)

(72) Inventors: Bjorn Drobe, Singapore (SG); Matthieu Guillot, Charenton-le-Pont (FR); Bruno Fermigier, Charenton-le-Pont (FR); Damien Paille, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 715 days.

(21) Appl. No.: 17/294,064

(22) PCT Filed: Nov. 14, 2019

(86) PCT No.: PCT/EP2019/081304
§ 371 (c)(1),
(2) Date: May 14, 2021

(87) PCT Pub. No.: WO2020/099549
PCT Pub. Date: May 22, 2020

(65) Prior Publication Data
US 2022/0004022 A1    Jan. 6, 2022

(30) Foreign Application Priority Data
Nov. 15, 2018    (EP) .................................. 18315041

(51) Int. Cl.
*G02C 7/00*    (2006.01)
*G02C 7/02*    (2006.01)
(Continued)

(52) U.S. Cl.
CPC ............. *G02C 7/022* (2013.01); *G02C 7/041* (2013.01); *G02C 7/06* (2013.01); *G02C 7/061* (2013.01); *G02C 2202/24* (2013.01)

(58) Field of Classification Search
CPC .......... G02C 7/022; G02C 7/041; G02C 7/06; G02C 7/061; G02C 2202/24
(Continued)

(56) References Cited

U.S. PATENT DOCUMENTS

2010/0296058 A1    11/2010    Ho et al.
2011/0228225 A1    9/2011    Liang
(Continued)

FOREIGN PATENT DOCUMENTS

CN    105388630 A    3/2016
CN    108714063 A    10/2018
(Continued)

OTHER PUBLICATIONS

International Search Report and Written Opinion issued Jan. 7, 2020 in PCT/EP2019/081304 filed Nov. 14, 2019.
(Continued)

*Primary Examiner* — Mahidere S Sahle
(74) *Attorney, Agent, or Firm* — Oblon, McClelland, Maier & Neustadt, L.L.P.

(57) ABSTRACT

A method is provided for determining an ophthalmic lens configured to correct an abnormal refraction of an eye of a wearer and including at least three optical elements disposed on a surface of the ophthalmic lens to suppress or reduce a progression of the abnormal refraction of the eye, the method including providing prescription data configured to correct the abnormal refraction; providing at least one abnormal refraction parameter relating to the abnormal refraction; providing at least one sensitivity parameter representing a variation of sensitivity of the wearer as a function
(Continued)

of at least one parameter of the optical elements; determining a value of the at least one parameter of the optical elements configured for the wearer based on the abnormal refraction parameter and the sensitivity parameter; and determining the ophthalmic lens based at least on the provided prescription data and the value of the parameter of the optical elements.

13 Claims, 3 Drawing Sheets

(51) Int. Cl.
    *G02C 7/04*     (2006.01)
    *G02C 7/06*     (2006.01)

(58) Field of Classification Search
    USPC ............. 351/159.05–159.21, 159.41–159.49,
                             351/159.78–159.79
    See application file for complete search history.

(56) References Cited

U.S. PATENT DOCUMENTS

| | | | |
|---|---|---|---|
| 2012/0194780 A1* | 8/2012 | Back | G02C 7/041 |
| | | | 351/159.73 |
| 2012/0320333 A1 | 12/2012 | Holden et al. | |
| 2015/0085247 A1 | 3/2015 | Holden et al. | |
| 2015/0277145 A1 | 10/2015 | Bakaraju et al. | |
| 2016/0000314 A1 | 1/2016 | Drobe | |
| 2016/0062145 A1 | 3/2016 | Brennan et al. | |
| 2017/0038603 A1 | 2/2017 | Holden et al. | |
| 2017/0131567 A1 | 5/2017 | To et al. | |
| 2018/0228364 A1 | 8/2018 | Brennan et al. | |
| 2019/0212580 A1 | 7/2019 | To et al. | |
| 2019/0293963 A1 | 9/2019 | Holden et al. | |
| 2020/0089023 A1* | 3/2020 | Zhou | G02C 11/10 |

FOREIGN PATENT DOCUMENTS

| | | |
|---|---|---|
| JP | 6276322 B2 | 2/2018 |
| TW | 201523067 A | 6/2015 |
| WO | WO 2014/131791 A1 | 9/2014 |

OTHER PUBLICATIONS

Combined Taiwanese Office Action and Search Report issued Dec. 21, 2022, in corresponding Taiwanese Patent Application No. 108141685 (with English Translation), 7 pages.

* cited by examiner

METHOD FOR DETERMINING AN OPHTHALMIC LENS ADAPTED FOR CORRECTING AN ABNORMAL REFRACTION OF AN EYE OF A WEARER

FIELD OF THE INVENTION

The invention relates to a method for determining an ophthalmic lens adapted for correcting an abnormal refraction of an eye of a wearer, and comprising a plurality of optical elements placed on a surface of the ophthalmic lens so as to prevent or slow down a progression of the abnormal refraction of the eye.

BACKGROUND OF THE INVENTION

Myopia of an eye is characterized by the fact that the eye focuses distant objects in front of its retina, hypermetropia is characterized by the fact that the eye focuses distant objects behind of its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Recent improvements in the field of ophthalmic lenses, have allowed developing optical lenses comprising optical elements placed on one of its surface to prevent, or at least slow down, the progression of abnormal refractions of an eye such as myopia or hyperopia.

Although the use of optical lenses comprising optical elements to focus an image on a position other than the retina has shown to present good results in preventing and slowing down the progression of an abnormal refraction of an eye, the utilization of such lenses may have some drawback.

Indeed, the optical elements placed on the surface of the ophthalmic lens may generate a multiplicity of blur images that may superpose on the retina with the sharp image generated by the ophthalmic lens. Such superposition of sharp and blur images may reduce the optical performances of the wearer, and/or its comfort. For example, a high density of optical elements on the surface of the ophthalmic lens may induce a loss of contrast sensitivity, and distortions that could lead to headaches. On the contrary, a small density of optical elements may have a really small impact on the prevention/slowing down of the abnormal refraction progression.

Therefore, there is a need to provide a method for determining an ophthalmic lens adapted for correcting an abnormal refraction of an eye of a wearer while limiting the loss of comfort and performance of said wearer.

SUMMARY OF THE INVENTION

To this end, the invention proposes a method for example, implemented by computer means, for determining an ophthalmic lens adapted for correcting an abnormal refraction of an eye of a wearer, and comprising a plurality of at least three optical elements placed on at least one surface of said ophthalmic lens so as to suppress or reduce a progression of the abnormal refraction of the eye of the wearer, the method comprising:
  providing prescription data adapted at least for correcting the abnormal refraction of the eye of the wearer;
  providing at least one abnormal refraction parameter relating to the abnormal refraction of an eye of the wearer;
  providing at least one sensitivity parameter representing the variation of sensitivity of the wearer as a function of at least one parameter of the optical elements;
  determining a value of the at least one parameter of the optical elements adapted for the wearer based on the abnormal refraction parameter and the sensitivity parameter;
  determining an ophthalmic lens based at least on the prescription data and the value of the at least one parameter of the optical elements adapted for the wearer.

Advantageously, determining the ophthalmic lens based on the prescription data and the value of the at least one parameter of the optical elements adapted for the wearer allows determining an ophthalmic lens providing a good balance between preventing or slowing down an abnormal refraction of an eye of a wearer and limit the loss of visual comfort or performances of said user.

In other words, the method of the invention allows to manage the optical elements characteristics to determine an ophthalmic lens that allows to best prevent or slow down an abnormal refraction of an eye of a wearer without overly impacting the visual comfort and performances of said wearer.

According to further embodiments which can be considered alone or in combination:
  the method further comprises obtaining a threshold value; and/or
  the method further comprises determining a sensitivity value based on the value of the at least one parameter of the optical elements adapted for the wearer and the at least one sensitivity parameter; and/or
  the method further comprises comparing the sensitivity value and the threshold value; and/or
  the method further comprises determining a most appropriate value of the at least one parameter of the optical elements, the most appropriate value of the at least one parameter of the optical elements being the determined value of the at least one parameter of the optical elements when the sensitivity value is lower than the threshold value, and being the value associated with a sensitivity value equal to the threshold value when the sensitivity value is higher than or equal to the threshold value; and/or
  the ophthalmic lens is determined based on the prescription data and the most appropriate value of the at least one parameter of the optical elements adapted for the wearer; and/or the abnormal refraction of the eye corresponds to myopia; and/or the abnormal refraction of the eye corresponds to hypermetropia; and/or the at least one abnormal refraction parameter corresponds to a progression per year of the abnormal refraction of the eye of the wearer; and/or the at least one abnormal refraction parameter corresponds to a lag of accommodation of the wearer; and/or the at least one parameter of the optical elements corresponds to the number of optical elements on the surface of the ophthalmic lens; and/or the at least one optical element parameter corresponds to the density of optical elements over the surface of the ophthalmic lens; and/or the at least one optical element parameter corresponds to the position of the optical elements on the surface of the ophthalmic lens; and/or the at least one optical element parameter corresponds to the spacing between the optical elements over the surface of the ophthalmic lens; and/or the at least one optical element parameter corresponds to the size of the optical elements over the surface of the ophthalmic lens; and/or the at least one optical element parameter corresponds to the curvature of the surface of at least a plurality of three optical elements of the ophthalmic lens; and/or the at least one optical element parameter corresponds to the optical power of at least a plurality of three optical elements of the ophthalmic lens in standard wearing conditions; and/or the at least one sensitivity parameter corresponds to visual acuity; and/or the at least one sensitivity parameter corresponds to a contrast sensitivity; and/or the at least one sensitivity parameter corresponds to a level of comfort of the wearer while wearing the ophthalmic lens; and/or the method further comprises providing a viewing angle parameter relating to a specific viewing angle; and/or the method further comprises providing a viewing distance parameter relating to a specific viewing distance; and/or the at least one sensitivity parameter represents the variation of sensitivity of the wearer for the at least one viewing angle and at least one viewing distance, as a function of at least one parameter of the optical elements.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a method for determining an ophthalmic lens adapted for correcting an abnormal refraction of an eye of a wearer.

The ophthalmic lens according to the invention is adapted for a person and intended to be worn in front of an eye of said person. Moreover, the ophthalmic lens is intended to be worn in front of an eye of a person to provide eyesight correction and prevent or at least slow down a progression of abnormal refractions of the eye such as for example myopia, hyperopia or astigmatism.

Figure 1:
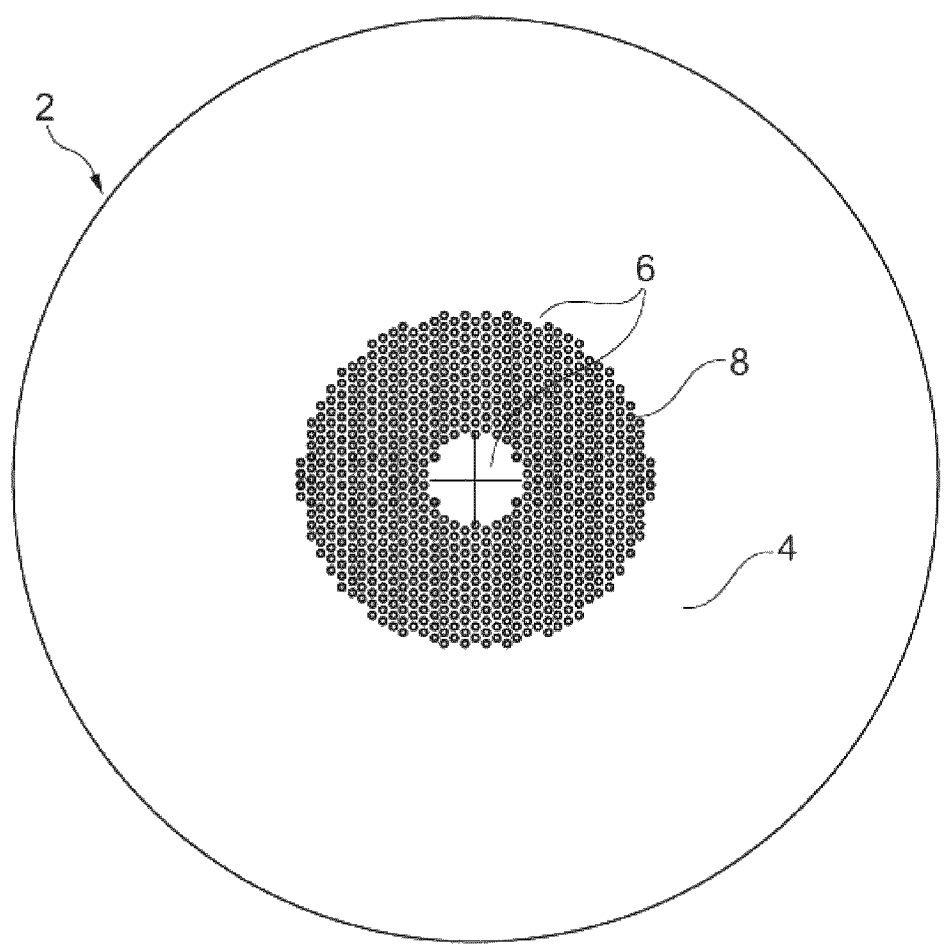
FIG. 1 illustrates a plan view of a ophthalmic lens according to an embodiment of the invention.

As illustrated on FIG. 1, the ophthalmic lens 2 according to the invention comprises a holder 4 having placed on at least one surface of said holder a refraction area 6 and a plurality of optical elements 8.

The holder 4 is, for example, made of polycarbonate material.

The refraction area 6 has a refractive power based on the prescription of the eye of the person for which the ophthalmic lens is adapted. The prescription is adapted for correcting the abnormal refraction of the eye of the person.

The term "prescription" is to be understood to mean a set of optical characteristics of optical power, of astigmatism, of prismatic deviation, determined by an ophthalmologist or optometrist in order to correct the vision defects of the eye, for example, by means of a lens positioned in front of his eye. For example, the prescription for a myopic eye comprises the values of optical power and of astigmatism with an axis for the distance vision.

According to an embodiment of the invention, the ophthalmic lens 2 comprising a first and a second faces opposed to each other.

The surface of the first face of the ophthalmic lens may comprise all of the optical elements. For example, the first face is the front face of the ophthalmic lens when worn by the wearer.

The shape of surface of the first face of the ophthalmic lens may be spherical. The surface of the second face of the ophthalmic lens is configured so as to provide in combination with the surface of the first face an optical function of focusing an image on the retina of the eye of the wearer when the ophthalmic lens is worn in specific wearing conditions, for example standard wearing conditions.

For example, the surface of the second face of the ophthalmic lens is sphero-torical. Advantageously, the surface of the second face is aspherical and calculated by an optical optimization such that every light beam incident on the refraction area 6 is focused on the retina of the wearer when the lens is worn in specific wearing conditions.

The refraction area 6 is preferably formed by the area not covered by any optical element of the plurality of optical elements 8. In other words, the refractive area is the complementary area to the areas formed by the plurality of optical elements 8.

According to different embodiments of the invention, the abnormal refraction of the eye may be myopia, hyperopia or astigmatism.

The ophthalmic lens 2 according to the invention further comprises a plurality of optical elements 8. The optical elements 8 are placed on at least one face of the ophthalmic lens. Preferably, the optical elements 8 are placed on the front face of the ophthalmic lens 2. The front face of the ophthalmic lens 2, or "object side" face, corresponds to the face of the ophthalmic lens which is not facing the eye of the person when the ophthalmic lens is worn in specific wearing conditions.

In the sense of the invention, the term "plurality of" is to be understood as "at least three".

At least one optical element of the plurality of optical elements 8, has an optical function of not focusing an image on the retina of the eye of the wearer.

When the abnormal refraction of the eye of the person corresponds to myopia the optical elements 8 have an optical function of focusing an image in front of the retina of the eye of the wearer when worn by the wearer.

When the abnormal refraction of the eye of the person corresponds to hypermetropia the optical elements 8 have an optical function of focusing an image behind the retina of the eye of the wearer when worn by the wearer.

In the sense of the invention "focusing" is to be understood as producing a focusing spot with a circular section that can be reduced to a point in the focal plane.

Advantageously, such optical function of the optical element produces an optical signal that inhibits the deformation of the retina of the eye of the wearer, allowing to prevent or at least slow down the progression of the abnormal refraction of the eye of the person wearing the ophthalmic lens 2.

Figure 2:
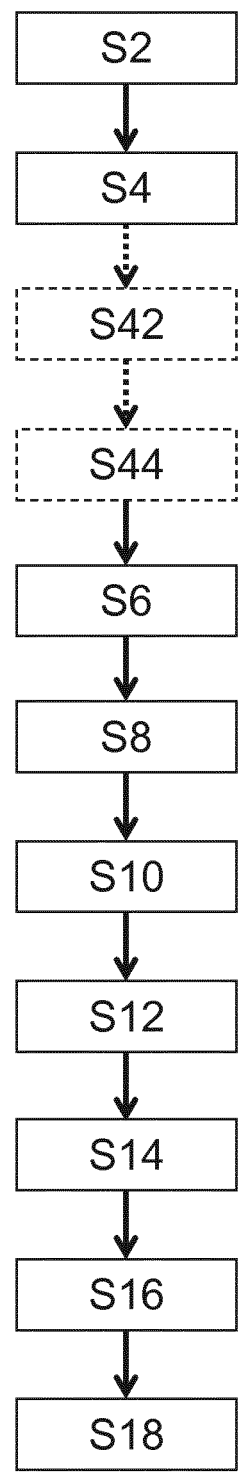
FIG. 2 is a chart-flow representative of a method for determining an ophthalmic lens according to the invention.

As illustrated on FIG. 2, the method for determining an ophthalmic lens according to the invention comprises a step S2 of providing prescription data. The prescription data are adapted at least for correcting the abnormal refraction of the eye of the wearer.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

According to different embodiments of the invention, the abnormal refraction of the eye may be myopia, hyperopia or astigmatism.

The method for determining an ophthalmic lens according to the invention further comprises a step S4 of providing at least one abnormal refraction parameter. The abnormal refraction parameter relates to the abnormal refraction of the eye of the wearer.

According to an embodiment of the invention, the abnormal refraction parameter may relate to a progression of the abnormal refraction over time. For example, the abnormal refraction parameter may be the evolution over a year, or over years of the abnormal refraction of the eye of the wearer.

The progression of the abnormal refraction may be determined by measuring the evolution of the prescription to correct the abnormal refraction of the eye of the wearer. Such parameter may also be characterized by a ratio of myopia evolution between a first initial measure of the abnormal refraction of the eye of the wearer and a second measure of said abnormal refraction.

According to another embodiment of the invention, the abnormal refraction parameter may relate to a lag of accommodation of the wearer. The lag of accommodation corresponds to the dioptric value in which the accommodative stimulus exceeds the accommodative response.

Lag of accommodation occurs when an eye shifts its regard from a far target to a target between the far one and the eye. In such situation the retinal conjugate point is beyond the nearer target regardless of the eye's effort to maintain distinct vision. In other words, instead of focusing right on the plane of the object, the eye actually focuses on a point behind it.

Figure 3:
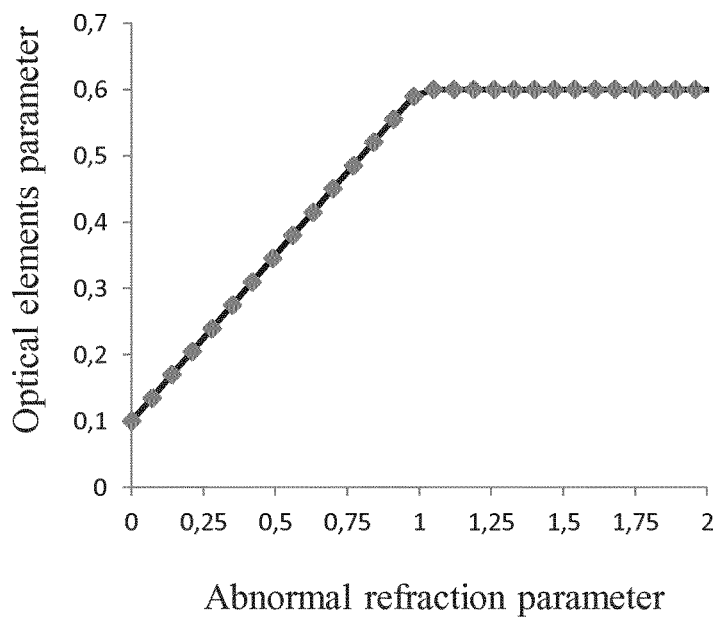
FIG. 3 illustrates a relation law between an abnormal refraction parameter and a parameter of the optical elements.

As illustrated on FIG. 3, the progression of the abnormal refraction of an eye of a wearer may be expressed as a function of at least one parameter of the optical elements.

Such function corresponds to a predefined law (L) that associates a value of progression of the abnormal refraction of an eye with a value of an optical parameter that is appropriate to prevent or slow-down said abnormal refraction. In other words, the law provides the required value of a parameter of the optical elements to best prevent or slow down the abnormal refraction of the eye.

According to an embodiment of the invention, the method for determining an ophthalmic lens according to the invention may further comprise a step S42 of providing a viewing distance parameter. The viewing distance parameter corresponds to a specific viewing distance. For example, the viewing distance may relate to far vision or near vision.

In the sense of the invention, the viewing distance corresponds to the distance between an eye of the wearer wearing an ophthalmic lens and the object seen by said wearer.

The method for determining an ophthalmic lens according to the invention may further comprise a step S44 of providing a viewing angle parameter. The viewing angle parameter corresponds to a specific viewing angle of the wearer.

In the sense of the invention, the viewing angle corresponds to the angle between the direction between the eye of the wearer and the object seen by said wearer wearing an ophthalmic lens, and a horizontal direction passing through the geometrical center of the lens and the geometrical center of the eye of the wearer.

The method for determining an ophthalmic lens according to the invention further comprises a step S6 of providing at least one sensitivity parameter. The sensitivity parameter represents the variation of a sensitivity of the wearer as a function of at least one parameter of the optical elements.

Figure 4:
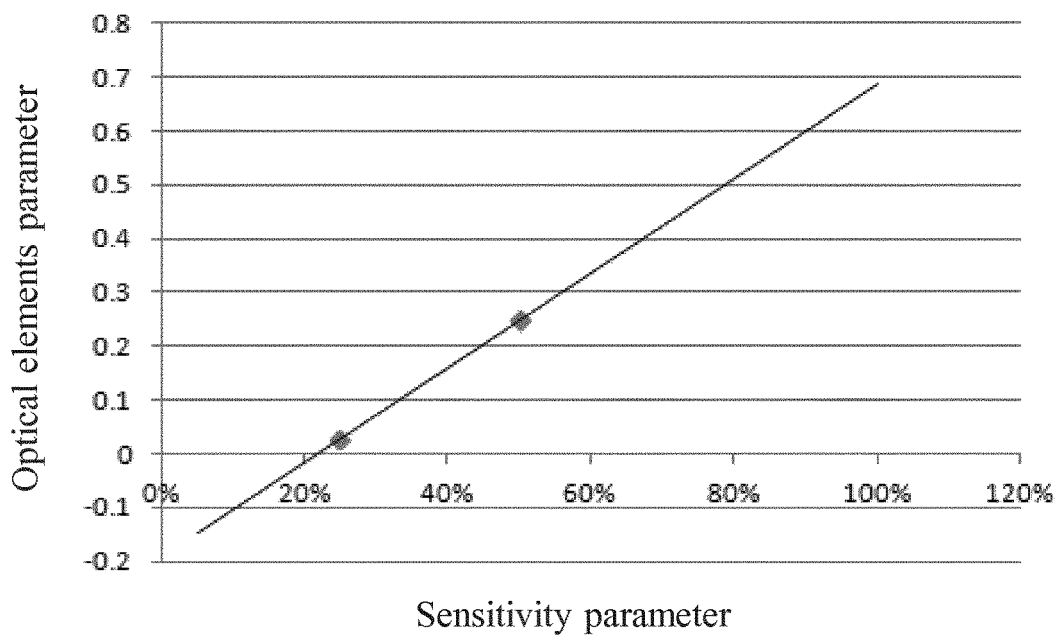
FIG. 4 illustrates a relation law between a parameter of the optical elements and a sensitivity parameter.

As illustrated on FIG. 4, the sensitivity parameter may be expressed as a function of at least one parameter of the optical elements.

The parameter of the optical elements impacts the sensitivity of the wearer wearing the ophthalmic lens. For example, a high density of optical elements placed on a surface of the ophthalmic lens may have a more important impact on the sensitivity of the wearer than a low density of optical elements.

Such sensitivity parameter may be determined for example, by measuring the perceived sensitivity of the wearer using ophthalmic lenses with different values of a parameter of the optical elements. For example, multiple ophthalmic lenses with increasing values of the optical elements density may be presented to a wearer that is asked to express his perceived sensitivity while wearing said lenses.

According to an embodiment of the invention, the sensitivity parameter may represent the variation of sensitivity of the wearer for specific provided viewing distance and viewing angle as a function of at least one parameter of the optical elements.

According to an embodiment of the invention, the at least one sensitivity parameter may relate to a visual acuity of the wearer, and more particularly to a drop of visual acuity of the wearer. The visual acuity of the wearer is a measure of the spatial resolution of the visual processing system of said wearer. The visual acuity commonly refers to the clarity of vision.

Commonly, the visual acuity is measured using a Snellen chart consisting of horizontal lines of letters whose size decreases with each successive line.

According to another embodiment of the invention, the at least one sensitivity parameter may relate to a contrast sensitivity, and more particularly to a loss of contrast sensitivity. The contrast sensitivity relates to the ability of a person to discern the difference in brightness of adjacent areas.

Commonly, the contrast sensitivity is measured using a Pelli Robson chart consisting of horizontal lines of letters whose contrast decreases with each successive line.

According to another embodiment of the invention, the at least one sensitivity parameter may relate to a level of comfort of the wearer. The level of comfort of a wearer represents its perceived quality of comfort while looking through an ophthalmic lens.

The method for determining an ophthalmic lens according to the invention further comprises a step S8 of determining a value of the at least one parameter of the optical elements. The value of the parameter of the optical elements is adapted for the wearer.

The value of the parameter of the optical elements is determined based on the abnormal refraction parameter. As represented on FIG. 3, the variation of the abnormal refraction parameter may be expressed as a function of at least one parameter of the optical elements. By reporting the value of the abnormal refraction parameter provided during step S4 of the method of the invention on the predefined law (L) representing the variation of an optical element parameter as a function of the abnormal refraction parameter, a value of a parameter of the optical elements that is appropriate to prevent or slow-down said abnormal refraction is obtained.

The method for determining an ophthalmic lens according to the invention may further comprises a step S10 of obtaining a threshold value. The threshold value represents a limit value of sensitivity over which the vision comfort or vision performance of a person becomes unacceptable.

The threshold value may be a predetermined value. Alternatively the threshold value may be specific to the wearer.

The method for determining an ophthalmic lens according to the invention may further comprises a step S12 of determining sensitivity value based on the value of the at least one parameter of the optical elements adapted for the wearer and the at least one sensitivity parameter.

The sensitivity parameter provided during step S6 represents the variation of the sensitivity of the wearer as a function of at least one parameter of the optical elements. By reporting the determined value of the optical elements on the function of the sensitivity parameter of the wearer, the value of the sensitivity parameter of the wearer for an ophthalmic lens comprising such optical elements may be determined.

The method according to the invention may further comprises a step S14 of comparing the sensitivity value determined in step S12 and the threshold value obtained in step S10.

The method for determining an ophthalmic lens according to the invention may further comprises a step S16 of determining a most appropriate value of the at least one parameter of the optical elements. The most appropriate value of the at least one parameter of the optical elements should be understood as the value of the parameter which is best adapted for the wearer. In other words, the most appropriate value corresponds to the of the at least one parameter of the optical elements that provides the best slowing-down and/or reduction and/or prevention of the progression of the abnormal refraction of the eye of the wearer without affecting the vision experience quality of the person.

When the determined value of the sensitivity parameter is lower than the threshold value, the previously determined value of the parameter of the optical elements is the most appropriate value of the at least one parameter of the optical elements. Otherwise, when the determined value of the sensitivity parameter is higher than, or equal to the threshold value, the most appropriate value of the at least one parameter of the optical elements is the value associated with a sensitivity value equal to the threshold value.

The method for determining an ophthalmic lens according to the invention further comprises a step S18 of determining an ophthalmic lens based at least on the prescription data and the most appropriate value of the at least one parameter of the optical elements adapted for the wearer.

Advantageously, such method allows determining a parameter of the optical elements of the ophthalmic lens that provide the best possible prevention or slowing down of the abnormal refraction without overly reducing the visual comfort or performance of the wearer.

According to an embodiment of the invention, the parameter of the optical elements corresponds to the number of optical elements placed on the surface of the ophthalmic lens.

According to another embodiment of the invention, the parameter of the optical elements corresponds to the density of optical elements placed on the surface of the ophthalmic lens.

The parameter of the optical elements may also correspond to the position of the optical elements on the surface of the ophthalmic lens.

According to another embodiment of the invention, the parameter of the optical elements corresponds to the spacing between the optical elements. The spacing between the optical elements relates to the distance between the external limit of the surface each adjacent optical elements. The optical elements have a contour shape that is inscribable in a circle, and said circle represents the surface of said optical element.

The parameter of the optical elements may further correspond to the size of the optical elements placed on the surface of the ophthalmic lens. In the sense of the invention, the size of the optical elements refers to the size of the surface of said optical elements.

The parameter of the optical elements may further correspond to the surface curvature of the optical elements.

According to another embodiment of the invention, the parameter of the optical elements corresponds to the optical power of the optical elements of the ophthalmic lens in specific wearing conditions. The specific wearing conditions preferably relates to standard wearing conditions, however the specific wearing condition may be personalized wearing conditions that are measured on the wearer when the wearer wears a spectacle frame he/she chose.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining an ophthalmic lens configured to correct an abnormal refraction of an eye of a wearer and comprising at least three optical elements disposed on at least one surface of the ophthalmic lens to suppress or reduce a progression of the abnormal refraction of the eye of the wearer, the method comprising:
   providing prescription data configured at least to correct the abnormal refraction of the eye of the wearer;
   providing at least one abnormal refraction parameter relating to the abnormal refraction of the eye of the wearer;
   providing at least one sensitivity parameter representing a variation of sensitivity of the wearer as a function of at least one parameter of the optical elements, the at least one sensitivity parameter relating to at least one of a visual acuity of the wearer, a drop of visual acuity of the wearer, a contrast sensitivity of the wearer, a loss of contrast sensitivity of the wearer, and a level of comfort of the wearer;
   determining a value of the at least one parameter of the optical elements configured for the wearer based on the abnormal refraction parameter and the sensitivity parameter; and
   determining the ophthalmic lens based at least on the provided prescription data and the value of the at least one parameter of the optical elements configured for the wearer,
   wherein the at least three optical elements are microlenses.

2. The method according to claim 1, further comprising:
   obtaining a threshold value;
   determining a sensitivity value based on the value of the at least one parameter of the optical elements configured for the wearer and the at least one sensitivity parameter;
   comparing the sensitivity value and the threshold value; and
   determining a most appropriate value of the at least one parameter of the optical elements, the most appropriate value of the at least one parameter of the optical elements being the determined value of the at least one parameter of the optical elements when the sensitivity value is lower than the threshold value, and being the value associated with a sensitivity value equal to the threshold value when the sensitivity value is greater than or equal to the threshold value,
   wherein the ophthalmic lens is determined based on the prescription data and the most appropriate value of the at least one parameter of the optical elements configured for the wearer.

3. The method according to claim 1, wherein the abnormal refraction of the eye corresponds to myopia.

4. The method according to claim 1, wherein the at least one abnormal refraction parameter corresponds to a progression per year of the abnormal refraction of the eye of the wearer.

5. The method according to claim 1, wherein the at least one abnormal refraction parameter corresponds to a lag of accommodation of the wearer.

6. The method according to claim 1, wherein the at least one parameter of the optical elements corresponds to a number of the optical elements on the at least one surface of the ophthalmic lens.

7. The method according to claim 1, wherein the at least one optical element parameter corresponds to a density of the optical elements over the at least one surface of the ophthalmic lens.

8. The method according to claim 1, wherein the at least one optical element parameter corresponds to a position of the optical elements on the at least one surface of the ophthalmic lens.

9. The method according to claim 1, wherein the at least one optical element parameter corresponds to a spacing between the optical elements over the at least one surface of the ophthalmic lens.

10. The method according to claim 1, wherein the at least one optical element parameter corresponds to a size of the optical elements over the at least one surface of the ophthalmic lens.

11. The method according to claim 1, wherein the at least one optical element parameter corresponds to a curvature of the at least one surface of the at least three optical elements of the ophthalmic lens.

12. The method according to claim 1, wherein the at least one optical element parameter corresponds to an optical power of the at least three optical elements of the ophthalmic lens in standard wearing conditions.

13. The method according to claim 1, further comprising, prior to providing the at least one sensitivity parameter:
   providing a viewing angle parameter relating to a specific viewing angle; and
   providing a viewing distance parameter relating to a specific viewing distance,
   wherein the at least one sensitivity parameter represents a variation of sensitivity of the wearer for at least one viewing angle and at least one viewing distance, as a function of the at least one parameter of the at least three optical elements.

\* \* \* \* \*